(12) United States Patent
Kurita et al.

(10) Patent No.: US 6,809,461 B2
(45) Date of Patent: Oct. 26, 2004

(54) DRIVE UNIT

(75) Inventors: Kazuhito Kurita, Kanagawa (JP); Toru Morikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/338,389

(22) Filed: Jan. 8, 2003

(65) Prior Publication Data

US 2003/0168940 A1 Sep. 11, 2003

(30) Foreign Application Priority Data

Jan. 10, 2002 (JP) ..................................... P2002-003853
Dec. 13, 2002 (JP) ..................................... P2002-361695

(51) Int. Cl.[7] .............................................. H02N 2/00
(52) U.S. Cl. ...................................................... 310/328
(58) Field of Search .............................. 310/328, 323.01, 310/326, 345, 317, 323; 369/75–77

(56) References Cited

U.S. PATENT DOCUMENTS

| 5,831,958 | A | * | 11/1998 | Kurita | .................... | 369/77.2 |
| 6,055,124 | A | * | 4/2000 | Habara et al. | ............. | 369/77.2 |
| 6,211,607 | B1 | * | 4/2001 | Kanbara | ..................... | 310/328 |
| 6,251,658 | B1 | * | 6/2001 | Henderson et al. | ......... | 310/328 |
| 6,392,827 | B1 | * | 5/2002 | Ueyama et al. | ............. | 310/328 |
| 6,515,954 | B1 | * | 2/2003 | Nakamura et al. | ......... | 369/75.2 |

* cited by examiner

Primary Examiner—Thomas M. Dougherty
Assistant Examiner—Karen Beth Addison
(74) Attorney, Agent, or Firm—Jay H. Maioli

(57) ABSTRACT

A drive unit includes a drive shaft at an end of a vibrating element that expands and contracts in the predetermined axial direction by application of a predetermined voltage, wherein a movable member is moved by differentiating the speed of expansion and contraction in the predetermined axial direction, a fixing member is fixed to one end of the vibrating element and the other end is fixed to the drive shaft, and a damping member fixes the fixing member to the drive unit while damping vibrations are provided.

5 Claims, 5 Drawing Sheets

DRIVE UNIT

BACKGROUND OF THE INVENTION

1. Field of the Invention

The present invention relates to reduction of vibrations of a drive unit for driving a movable member using a piezoelectric transducer that expands and contracts in the prescribed axial direction by applying a prescribed voltage.

2. Description of the Related Art

An impact drive actuator employing a piezoelectric transducer, which corresponds to a linear motion actuator, as a drive mechanism for driving a driven body is known. An example of the drive mechanism employing a conventional impact drive actuator is shown in FIG. 1.

An impact drive actuator 1 is a cylindrical piezoelectric element as a piezoelectric transducer formed of piezoelectric ceramic. Application of saw tooth voltage continuously on the piezoelectric element of the impact drive actuator 1 as shown in FIG. 2 or FIG. 3 enables generation of linear vibrations of, for example, about 60 kHz to 70 kHz.

A movable shaft 2 is fixedly joined at one end thereof to one end surface of the piezoelectric element 1 in the direction of vibrations by means of strong adhesive or the like. A fixing member 3 is fixedly joined to the other end surface of the piezoelectric element 1 also by means of strong adhesive or the like. The fixing member 3 is fixed to a supporting member 4 such as a chassis. The other end of the movable shaft 2 that is not shown in the figure is held by the supporting member loosely to an extent that does not cause rattling.

An optical pickup 5 frictionally holds the movable shaft 2 by clamping the same with a slider 6 provided at one end thereof and a leaf spring 7 that corresponds to a resilient body fixed thereon with a screw 7a. A guide shaft 8 is inserted through and held by a shaft hole 5a formed through the other end of the optical pickup 5. Both ends of the guide shaft 8 are fixed to the supporting member.

The drive mechanism employing the impact drive actuator arranged as described above expands in the direction indicated by an arrow a in FIG. 1 in the period of a shown in FIG. 2 by applying a saw tooth voltage on the piezoelectric element 1, and the movable shaft 2 fixed at one end thereof to the piezoelectric element moves in the direction indicated by an arrow a in FIG. 1. In this case, since the optical pickup 5 is frictionally held and engaged by a frictional holding mechanism of the movable shaft 2 constructed of the leaf spring 7 and the slider 6, the optical pickup 5 moves in the direction c in association with the movement of the movable shaft 2 in the direction indicated by the arrow a. When a voltage to be applied on the piezoelectric element 1 is abruptly changed in the period of b shown in FIG. 2 after a predetermined stop period c has elapsed, the piezoelectric element 1 abruptly contracts in the direction indicated by the arrow b in FIG. 1. In association of abrupt change of the piezoelectric element 1, the movable shaft 2 moves abruptly in the direction indicated by the arrow b. As a result of abrupt movement of the movable shaft 2, an optical pickup frictionally engaged by the movable shaft via the frictional holding mechanism stays in the vicinity of the position where it has been stopped during a stop period c in FIG. 2. By repeating such action, the optical pickup 5 is enabled to move in the direction indicated by an arrow c in FIG. 1.

When a voltage as shown in FIG. 3 is applied on the piezoelectric element 1, the optical pickup 5 moves toward the direction indicated by an arrow d in FIG. 1, which is the direction opposite from the direction of movement described in conjunction with FIG. 2.

The fixing member 3 of the piezoelectric element 1 is, as shown in FIG. 4, fixedly adhered by being fitted into a hole 4a formed on the supporting member 4 such as the chassis by means of an adhesive agent 9. Therefore, vibrations transmitted from the supporting member 4 tends to be transmitted to the piezoelectric element via the adhesive agent 9 and the fixing member 3, which causes a problem in that an unnecessary turbulence vibrations are transmitted to the piezoelectric element and thus accurate vibrations to drive the optical pickup 5 accurately are hindered. There is also a case in which vibrations of the piezoelectric element 1 is transmitted to the supporting member 4 via the fixing member 3 on the contrary, and the piezoelectric element 1 and the supporting member 4 may vibrate sympathetically, which may also hinder accurate vibrations of the piezoelectric element. In this case, frequency of sympathetic vibration is 1/T Hz in the case of FIG. 2 and FIG. 3.

Fixing the fixing member 3 of the piezoelectric element 1 to the supporting member 4 by means of adhesive agent requires management of equipment of adhering operation, the quantity of adhesive agent, and the period of time required for adhesion. In addition, there are problems in that adhesive agent makes disassembly of the piezoelectric element 1 difficult, or adhesive agent attached on other components causes another defective.

SUMMARY OF THE INVENTION

Accordingly, it is an object of the present invention to provide a drive unit for driving a movable portion including a vibrating unit that expands or contracts in the predetermined direction by being applied with a predetermined voltage, a movable shaft unit fixed at one end to an end of the vibrating unit and movably supported at the other end, and being moved in the direction of expansion or contraction of the vibrating unit, an engaging unit for frictionally engaging the movable portion with the movable shaft unit, a fixing unit to be fixed at the end of the vibrating unit whereon the movable shaft unit is fixed at the other end, a drive control unit for applying driving voltage for differentiating speed of expansion and contraction of the vibrating unit, and a damping member for supporting the fixing unit in a stationary member with vibrations attenuated.

DESCRIPTION OF THE PREFERRED EMBODIMENTS

Figure 1:
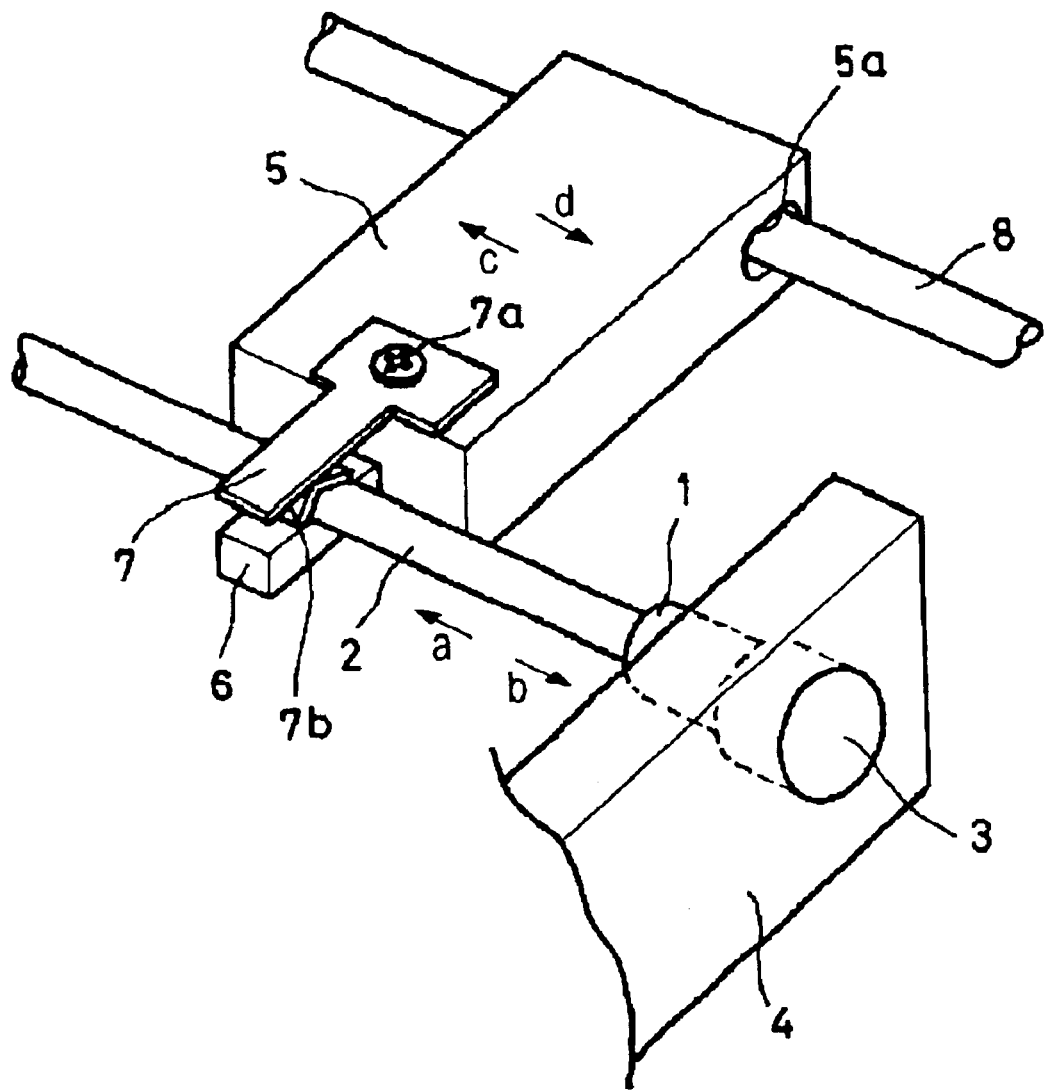
FIG. 1 an appearance perspective view of a conventional drive mechanism employing an impact drive actuator.

Referring now to the drawings, a case in which an embodiment of a drive mechanism according to the present invention is employed for an impact drive actuator for driving an optical pickup will be described.

Figure 5:
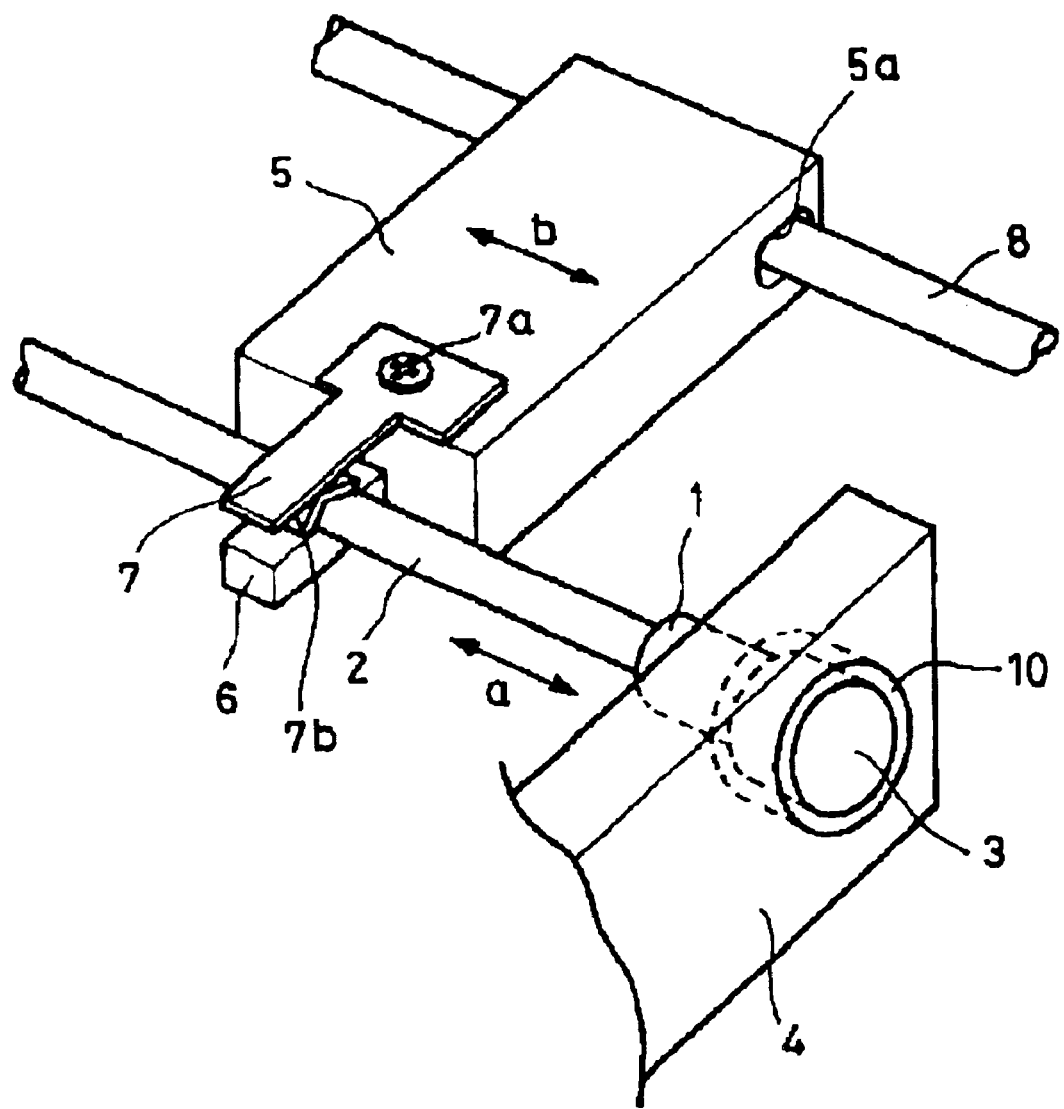
FIG. 5 is an appearance perspective view of a drive mechanism employing an impact drive actuator according to the invention.

FIG. 5 is an appearance perspective view of the optical pickup embodying the invention and the impact drive actuator thereof.

Figure 2:
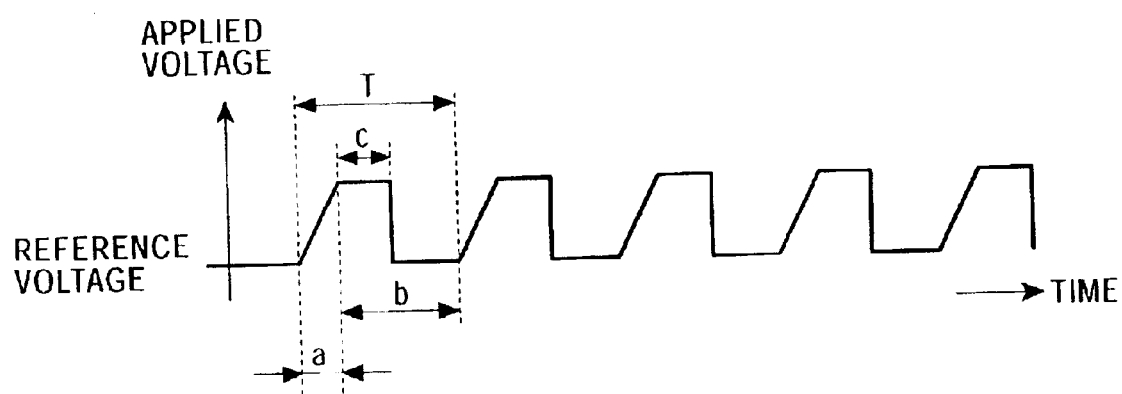
FIG. 2 is an example of the voltage waveform applied on the piezoelectric element.
Figure 3:
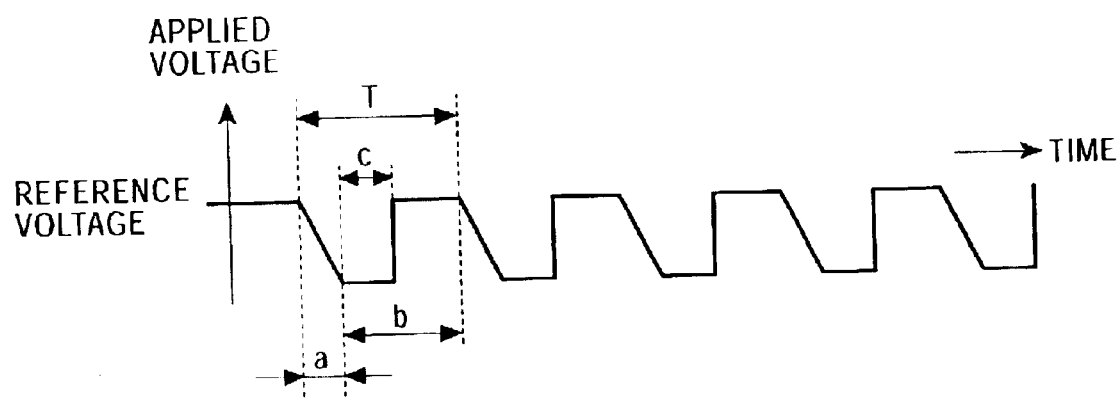
FIG. 3 is another example of the voltage waveform applied on the piezoelectric element.
Figure 4:
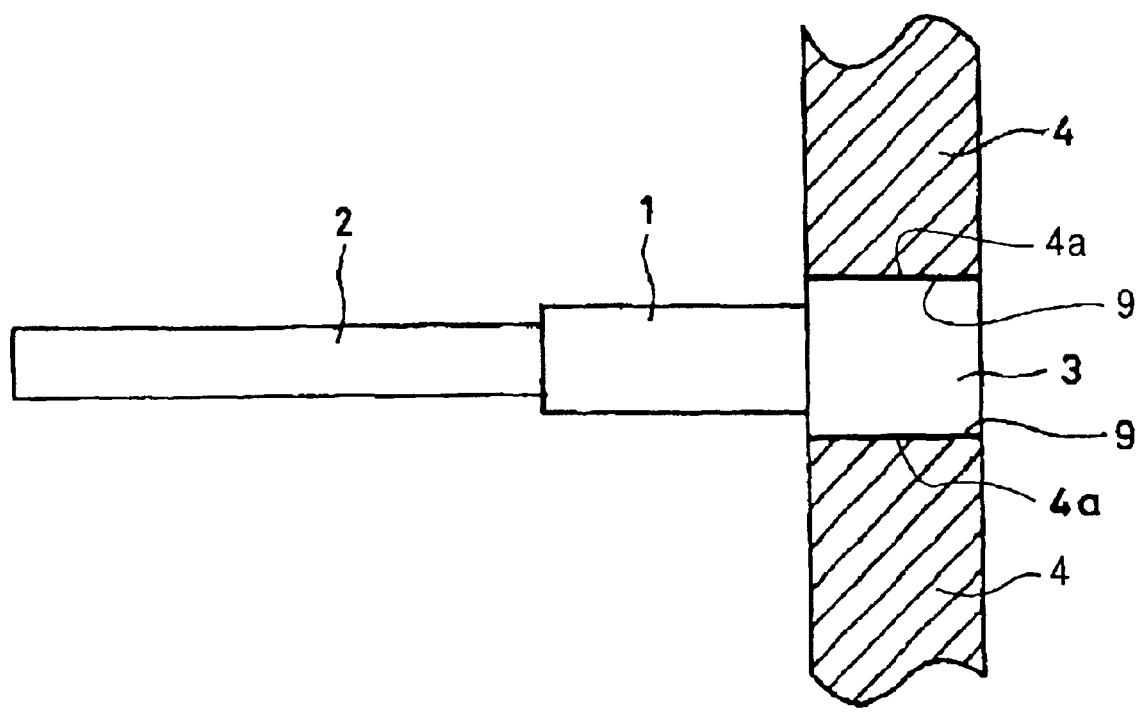
FIG. 4 is an enlarged cross sectional view of a conventional fixing structure between the fixing member and the supporting member of the piezoelectric element.

The piezoelectric element 1 is a vibrating element formed of piezoelectric ceramic, which is an impact drive actuator, formed into a cylindrical shape. The piezoelectric element generates axial linear vibrations of, for example, 60 kHz to 70 kHz by being applied with continuous saw tooth voltage as shown in FIG. 2 or FIG. 3.

A surface of the piezoelectric element 1 at the end in the direction of vibrations is fixed to an end of the movable shaft 2 by means of strong adhesive or the like. The end surface of the piezoelectric element 1 is fixedly bonded to the fixing member 3 by means of the same adhesive or the like. The fixing member 3 is fixed to the supporting member 4 such as a chassis. Since the fixing unit between the fixing member 3 and the supporting member 4 is a principal portion of the invention, it will be described in detail later.

The other end of the movable shaft 2, not shown, of the piezoelectric element 1 is held by the supporting member to the extent of loosely to an extent that does not cause rattling.

The optical pickup 5 is frictionally held by clamping the movable shaft 2 between a slider 6 provided at one end of the optical pickup 5 and a cap 7b urged radially of the actuator by a leaf spring 7 formed of a resilient body fixed by the screw 7a. At the other end of the optical pickup 5, a guide shaft 8 is inserted into and held in a shaft hole 5a formed through the optical pickup 5. Both ends of the guide pin 8 are fixed to the supporting member.

The fixing member 3 and the supporting member 4 are fixed with a damping member 10 formed of viscous resilient member interposed therebetween. For example, gum butyl rubber or elastomer is suitable for the damping member 10.

The damping member 10 is a member that does not resonate with vibrations of 60 kHz to 70 kHz, that are reciprocal number of the cycle T of repetition of a voltage that drives the piezoelectric element 1 shown in FIG. 2 or FIG. 3.

The frequency of vibrations of the drive voltage is preferably set to the value out of the range audible for human being so that users cannot hear sonic waves generated by vibrations of the piezoelectric element 1 and the optical pickup 5.

Figure 6:
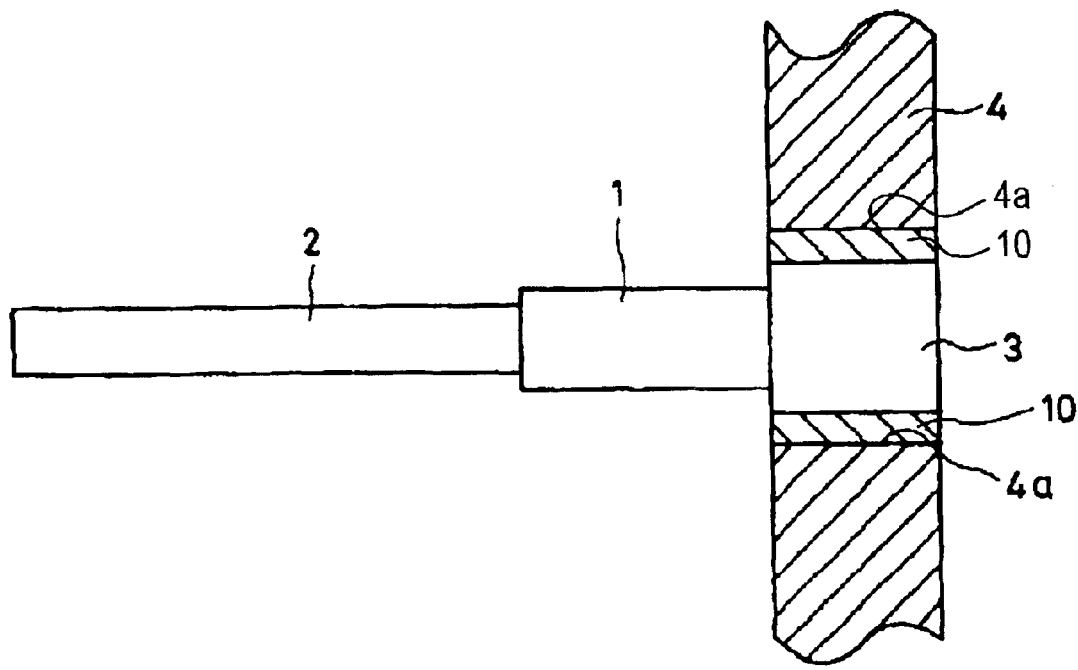
FIG. 6 is an enlarged cross sectional view of the fixed state between the fixing member and the supporting member of the piezoelectric element.
Figure 7:
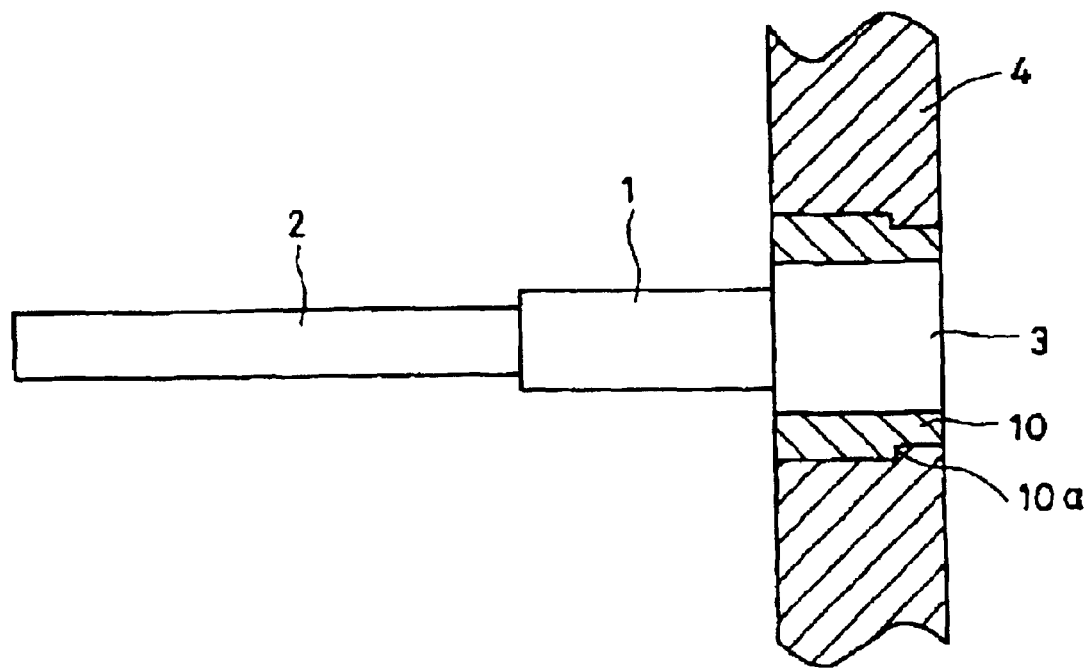
FIG. 7 is an enlarged cross sectional view of the fixed state between the fixing member and the supporting member of the piezoelectric element in according to another embodiment of the invention.

FIG. 6 is an enlarged cross sectional view of the fixed state between the piezoelectric element 1 and the fixing member 3.

As an example, when the fixing member 3 is cylindrical in shape, a ring shaped damping member 10 is press-fitted on the outer periphery of the fixing member 3 before being fitted and fixed. The fixing unit 3 fitted with a damping member thereon is inserted and fixedly secured into a hole 4a formed on the supporting member 4 by press-fitting. When the fixing member 3 is square in shape, a square shaped damping member 10 is inserted and fitted on thereon, and the damping member 10 is inserted into the square hole on the supporting member 4. In this manner, the shape of the fixing member 3 is not limited to a cylindrical shape.

As another method, the damping member 10 being formed integrally with the fixing member 3 by outsert molding may be press-fitted into the hole on the supporting member 4.

As still another method, a shoulder 10a is formed on the outer periphery of the damping member 3 formed on the fixing member 10 by outsert molding, and the molded shoulder 10a is press-fitted into the hole formed on the supporting member 4 with the shoulder 10a engaged with the inner peripheral surface thereof. In this structure, the fixing member 3 may be registered accurately with respect to the supporting member, and thus assembling property may be improved.

In the drive mechanism of the invention in this arrangement, since unnecessary vibrations from the external members such as a chassis are absorbed and attenuated by the damping member 10 and hence are not easily transmitted to the fixing member 3 or the piezoelectric element 1, the piezoelectric element 1 is not much influenced by the vibrations from the outside. Accordingly, accurate vibrations as specified for the piezoelectric element 1 is achieved, and thus the optical pickup 5 may be driven with high degree of accuracy.

Although vibrations of the piezoelectric element 1 are transmitted to the fixing member 3, vibrations of the fixing member 3 are absorbed and attenuated by the damping member 10, and thus the piezoelectric element 1 does not vibrates synthetically with an externally provided supporting member 4 such as the chassis.

Since the damping member 10 has a coefficient of vibration different from that of the piezoelectric element 1, which is in the range of 60 k to 70 k, the piezoelectric element 1 and the damping member 10 do not vibrate synthetically.

Furthermore, since an adhesive agent is not used for fixing the fixing member 3 of the piezoelectric element 1 and the external member 4 such as a chassis, management of the adhesive equipment, the quantity of adhesive agent or the period or time requiring for adhesion is not necessary in the assembling step, and hence the piezoelectric element 1 may be disassembled easily. In addition, the problem in that occurrence of defective on other components caused by adhesive agent attached thereon may be avoided, and thus cost reduction may be achieved.

The present invention is not limited to the embodiments described above and shown in the figures, and various modifications are possible without departing from the scope of the invention.

Although the damping member 10 described in this embodiment is a gum viscous resilient member such as butyl rubber or elastomer, other viscous resilient member having good vibration absorbing properties may be used.

The structure of the optical pickup 5 frictionally clamping the movable shaft 2 is not limited to the one in the embodiments, and the structure in which the optical pickup 5 is driven by vibrations of the movable shaft 2 is also applicable.

Although the case in which an optical pickup is used as a driven body has been described, it is widely applicable to the driven bodies that are driven by the impact driving actuator.

As is described thus far, the drive mechanism according to the invention is constructed in such a manner that the fixing member of the vibrating element is supported by the external member such as a chassis with the viscous resilient member interposed therebetween. Therefore, unnecessary vibrations from the external member are absorbed and attenuated by the viscous resilient member, and hence are not transmitted easily to the fixing member or to the vibrating element. As a consequence, the vibrating element is not influenced by vibrations from the outside, and thus accurate vibrations as specified for the piezoelectric element 1 is achieved, which enables to drive the driven body with high degree of accuracy and to provide the drive mechanism for the impact drive actuator with high degree of reliability.

Although vibrations of the vibrating element are transmitted to the fixing member, vibrations of the fixing member are absorbed and attenuated by the viscous resilient member, and thus the vibrating element does not vibrate sympathetically with the external member.

What is claimed is:

1. A drive unit mounted on a chassis for driving a movable portion including a vibrating unit that expands or contracts in a predetermined direction upon being applied with a predetermined voltage, the drive unit comprising:

a movable shaft unit fixed at one end to an end of the vibrating unit and supported at an other end and being moved in the predetermined direction of expansion or contraction of the vibrating unit;

an engaging unit for frictionally engaging the movable portion with the movable shaft unit;

a fixing unit fixed at an end of the vibrating unit opposite to the end of the vibrating unit to which the movable shaft unit is fixed;

a drive control unit for applying a driving voltage for differentiating a speed of expansion and contraction of the vibrating unit; and a damping member for surrounding and supporting the fixing unit in a hole formed in the chassis and for attenuating vibrations of the chassis caused by the driving voltage applied to the vibrating unit and for attenuating vibrations transmitted by the chassis from outside of the drive unit.

2. The drive unit according to claim 1, wherein a coefficient of vibration of the damping unit is different from a reciprocal number of a cycle of repetition of the driving voltage applied by the drive control unit to drive the vibrating unit.

3. The drive unit according to claim 1, wherein the damping member comprises a viscous resilient member.

4. The drive unit according to claim 1, wherein the damping member is formed integrally with the chassis by outsert molding.

5. The drive unit according to claim 1, wherein the damping member is formed of one of a butyl rubber and an elastomer.

* * * * *